United States Patent
Xian et al.

(10) Patent No.: US 9,530,038 B2
(45) Date of Patent: Dec. 27, 2016

(54) INDICIA-READING SYSTEM

(71) Applicant: Hand Held Products, Inc., Fort Mill, SC (US)

(72) Inventors: Tao Xian, Columbus, NJ (US);
Haiyang Liu, Plymouth, MN (US);
Edward C. Bremer, Victor, NY (US);
Taylor Smith, Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/525,256

(22) Filed: Oct. 28, 2014

(65) Prior Publication Data

US 2015/0144701 A1    May 28, 2015

Related U.S. Application Data

(60) Provisional application No. 61/908,204, filed on Nov. 25, 2013.

(51) Int. Cl.
| | |
|---|---|
| *G06K 15/00* | (2006.01) |
| *G06K 7/10* | (2006.01) |
| *H02J 5/00* | (2016.01) |
| *H02J 7/02* | (2016.01) |
| *G07G 1/00* | (2006.01) |
| *H02J 7/00* | (2006.01) |

(52) U.S. Cl.
CPC ......... *G06K 7/10881* (2013.01); *G07G 1/0018* (2013.01); *G07G 1/0081* (2013.01); *H02J 5/005* (2013.01); *H02J 7/0052* (2013.01); *H02J 7/025* (2013.01); *H02J 2007/0059* (2013.01)

(58) Field of Classification Search
USPC .......................... 235/375, 383, 385, 462.14, 462.45, 235/472.01–472.03, 462.43, 462.46
See application file for complete search history.

(56) References Cited

U.S. PATENT DOCUMENTS

| | | | |
|---|---|---|---|
| 5,844,221 A * | 12/1998 | Madigan et al. ............. | 235/383 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |

(Continued)

FOREIGN PATENT DOCUMENTS

| | | |
|---|---|---|
| EP | 0385502 A2 | 9/1990 |
| WO | 2011150330 A1 | 12/2011 |

(Continued)

OTHER PUBLICATIONS

U.S. Appl. No. 13/367,978, filed Feb. 7, 2012, (Feng et al.); now abandoned.

(Continued)

*Primary Examiner* — Tuyen K Vo
(74) *Attorney, Agent, or Firm* — Additon, Higgins & Pendleton, P.A.

(57) ABSTRACT

Indicia-reading systems include an auxiliary reading apparatus with wireless charging capability. The systems are configured to couple, transfer, and receive energy wirelessly between a base charging station and auxiliary indicia reader via resonating coils that include an impedance matching network. Wireless charging capability can save space at the point-of-sale and add convenience for the operator.

13 Claims, 4 Drawing Sheets

(56) References Cited

U.S. PATENT DOCUMENTS

| | | | |
|---|---|---|---|
| 7,546,953 B1* | 6/2009 | Collins, Jr. | G06K 7/10594 |
| | | | 235/462.14 |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 2002/0057852 A1* | 5/2002 | Durbin | G06K 7/1491 |
| | | | 382/312 |
| 2005/0283402 A1* | 12/2005 | Mason | 705/16 |
| 2006/0158152 A1* | 7/2006 | Taniguchi et al. | 320/106 |
| 2007/0063048 A1 | 3/2007 | Havens et al. | |
| 2007/0090190 A1* | 4/2007 | Kuromatsu et al. | 235/454 |
| 2008/0150478 A1* | 6/2008 | Baker | B65H 26/02 |
| | | | 320/108 |
| 2008/0185432 A1 | 8/2008 | Caballero et al. | |
| 2008/0223935 A1* | 9/2008 | Marty et al. | 235/470 |
| 2008/0297349 A1 | 12/2008 | Leone | |
| 2009/0134221 A1 | 5/2009 | Zhu et al. | |
| 2009/0250519 A1* | 10/2009 | Yamada et al. | 235/454 |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2011/0050164 A1* | 3/2011 | Partovi | H01F 5/003 |
| | | | 320/108 |
| 2011/0169999 A1 | 7/2011 | Grunow et al. | |
| 2011/0202554 A1 | 8/2011 | Powilleit et al. | |
| 2012/0111946 A1 | 5/2012 | Golant | |
| 2012/0138685 A1 | 6/2012 | Qu et al. | |
| 2012/0168512 A1 | 7/2012 | Kotlarsky et al. | |
| 2012/0193423 A1 | 8/2012 | Samek | |
| 2012/0203647 A1 | 8/2012 | Smith | |
| 2012/0223141 A1 | 9/2012 | Good et al. | |
| 2012/0228382 A1 | 9/2012 | Havens et al. | |
| 2012/0248188 A1 | 10/2012 | Kearney | |
| 2012/0319645 A1* | 12/2012 | O'Donnell | H02J 7/025 |
| | | | 320/108 |
| 2013/0043312 A1 | 2/2013 | Van Horn | |
| 2013/0056285 A1 | 3/2013 | Meagher | |
| 2013/0070322 A1 | 3/2013 | Fritz et al. | |
| 2013/0075168 A1 | 3/2013 | Amundsen et al. | |
| 2013/0113298 A1 | 5/2013 | Ryu et al. | |

(56) References Cited

U.S. PATENT DOCUMENTS

| | | | |
|---|---|---|---|
| 2013/0117552 A1* | 5/2013 | Kim | H04M 19/047 713/100 |
| 2013/0175341 A1 | 7/2013 | Kearney et al. | |
| 2013/0175343 A1 | 7/2013 | Good | |
| 2013/0200158 A1 | 8/2013 | Feng et al. | |
| 2013/0256418 A1 | 10/2013 | Havens et al. | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0278425 A1 | 10/2013 | Cunningham et al. | |
| 2013/0287258 A1 | 10/2013 | Kearney | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0300204 A1* | 11/2013 | Partovi | H01F 38/14 307/104 |
| 2013/0300356 A1* | 11/2013 | Yang | H02J 7/0047 320/108 |
| 2013/0306728 A1 | 11/2013 | Thuries et al. | |
| 2013/0306730 A1 | 11/2013 | Brady et al. | |
| 2013/0306731 A1 | 11/2013 | Pedrao | |
| 2013/0307964 A1 | 11/2013 | Bremer et al. | |
| 2013/0308625 A1 | 11/2013 | Park et al. | |
| 2013/0313324 A1 | 11/2013 | Koziol et al. | |
| 2013/0313325 A1 | 11/2013 | Wilz et al. | |
| 2013/0341399 A1 | 12/2013 | Xian et al. | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008430 A1 | 1/2014 | Soule et al. | |
| 2014/0008439 A1 | 1/2014 | Wang | |
| 2014/0025584 A1 | 1/2014 | Liu et al. | |
| 2014/0027518 A1 | 1/2014 | Edmonds et al. | |
| 2014/0034734 A1 | 2/2014 | Sauerwein | |
| 2014/0036848 A1 | 2/2014 | Pease et al. | |
| 2014/0039693 A1 | 2/2014 | Havens et al. | |
| 2014/0042814 A1 | 2/2014 | Kather et al. | |
| 2014/0049120 A1 | 2/2014 | Kohtz et al. | |
| 2014/0049635 A1 | 2/2014 | Laffargue et al. | |
| 2014/0061305 A1 | 3/2014 | Nahill et al. | |
| 2014/0061306 A1 | 3/2014 | Wu et al. | |
| 2014/0063289 A1 | 3/2014 | Hussey et al. | |
| 2014/0066136 A1 | 3/2014 | Sauerwein et al. | |
| 2014/0067692 A1 | 3/2014 | Ye et al. | |
| 2014/0070005 A1 | 3/2014 | Nahill et al. | |
| 2014/0071840 A1 | 3/2014 | Venancio | |
| 2014/0074746 A1 | 3/2014 | Wang | |
| 2014/0075846 A1 | 3/2014 | Woodburn | |
| 2014/0076974 A1 | 3/2014 | Havens et al. | |
| 2014/0078341 A1 | 3/2014 | Havens et al. | |
| 2014/0078342 A1 | 3/2014 | Li et al. | |
| 2014/0078345 A1 | 3/2014 | Showering | |
| 2014/0084068 A1 | 3/2014 | Gillet et al. | |
| 2014/0097249 A1 | 4/2014 | Gomez et al. | |
| 2014/0098792 A1 | 4/2014 | Wang et al. | |
| 2014/0100774 A1 | 4/2014 | Showering | |
| 2014/0100813 A1 | 4/2014 | Showering | |
| 2014/0103115 A1 | 4/2014 | Meier et al. | |
| 2014/0104413 A1 | 4/2014 | McCloskey et al. | |
| 2014/0104414 A1 | 4/2014 | McCloskey et al. | |
| 2014/0104416 A1 | 4/2014 | Giordano et al. | |
| 2014/0104451 A1 | 4/2014 | Todeschini et al. | |
| 2014/0106594 A1 | 4/2014 | Skvoretz | |
| 2014/0106725 A1 | 4/2014 | Sauerwein | |
| 2014/0108010 A1 | 4/2014 | Maltseff et al. | |
| 2014/0108402 A1 | 4/2014 | Gomez et al. | |
| 2014/0108682 A1 | 4/2014 | Caballero | |
| 2014/0110485 A1 | 4/2014 | Toa et al. | |
| 2014/0114530 A1 | 4/2014 | Fitch et al. | |
| 2014/0124577 A1 | 5/2014 | Wang et al. | |
| 2014/0124579 A1 | 5/2014 | Ding | |
| 2014/0125842 A1 | 5/2014 | Winegar | |
| 2014/0125853 A1 | 5/2014 | Wang | |
| 2014/0125999 A1 | 5/2014 | Longacre et al. | |
| 2014/0129378 A1 | 5/2014 | Richardson | |
| 2014/0131438 A1 | 5/2014 | Kearney | |
| 2014/0131441 A1 | 5/2014 | Nahill et al. | |
| 2014/0131443 A1 | 5/2014 | Smith | |
| 2014/0131444 A1 | 5/2014 | Wang | |
| 2014/0131445 A1 | 5/2014 | Ding et al. | |
| 2014/0131448 A1 | 5/2014 | Xian et al. | |
| 2014/0133379 A1 | 5/2014 | Wang et al. | |
| 2014/0136208 A1 | 5/2014 | Maltseff et al. | |
| 2014/0140585 A1 | 5/2014 | Wang | |
| 2014/0151453 A1 | 6/2014 | Meier et al. | |
| 2014/0152882 A1 | 6/2014 | Samek et al. | |
| 2014/0158770 A1 | 6/2014 | Sevier et al. | |
| 2014/0159869 A1 | 6/2014 | Zumsteg et al. | |
| 2014/0160329 A1 | 6/2014 | Ren et al. | |
| 2014/0166755 A1 | 6/2014 | Liu et al. | |
| 2014/0166757 A1 | 6/2014 | Smith | |
| 2014/0166759 A1 | 6/2014 | Liu et al. | |
| 2014/0166760 A1 | 6/2014 | Meier et al. | |
| 2014/0166761 A1 | 6/2014 | Todeschini et al. | |
| 2014/0168787 A1 | 6/2014 | Wang et al. | |
| 2014/0175165 A1 | 6/2014 | Havens et al. | |
| 2014/0175169 A1 | 6/2014 | Kosecki et al. | |
| 2014/0175172 A1 | 6/2014 | Jovanovski et al. | |
| 2014/0175174 A1 | 6/2014 | Barber | |
| 2014/0191644 A1 | 7/2014 | Chaney | |
| 2014/0191913 A1 | 7/2014 | Ge et al. | |
| 2014/0197238 A1 | 7/2014 | Lui et al. | |
| 2014/0197239 A1 | 7/2014 | Havens et al. | |
| 2014/0197304 A1 | 7/2014 | Feng et al. | |
| 2014/0203087 A1 | 7/2014 | Smith et al. | |
| 2014/0204268 A1 | 7/2014 | Grunow et al. | |
| 2014/0214631 A1 | 7/2014 | Hansen | |
| 2014/0217166 A1 | 8/2014 | Berthiaume et al. | |
| 2014/0217180 A1 | 8/2014 | Liu | |
| 2014/0247004 A1* | 9/2014 | Kari | H02J 5/005 320/106 |
| 2014/0306654 A1* | 10/2014 | Partovi | H02J 7/025 320/108 |

FOREIGN PATENT DOCUMENTS

| | | |
|---|---|---|
| WO | 2013163789 A1 | 11/2013 |
| WO | 2013165165 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/376,472, for an Encoded Information Reading Terminal Including HTTP Server filed Aug. 4, 2014, (Lu); 30 pages.

U.S. Appl. No. 13/771,508 for an Optical Redirection Adapter, filed Feb. 20, 2013 (Anderson); 26 pages.

U.S. Appl. No. 14/340,716 for an Optical Imager and Method for Correlating a Medication Package With a Patient, filed Jul. 25, 2014 (Ellis); 26 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

(56) References Cited

OTHER PUBLICATIONS

U.S. Appl. No. 13/927,398 for a Code Symbol Reading System Having Adaptive Autofocus, filed Jun. 26, 2013 (Todeschini); 24 pages.
U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.
U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/370,267 for Industrial Design for Consumer Device Based Scanning and Mobility, filed Jul. 2, 2014 (Ma et al.); 45 pages.
U.S. Appl. No. 14/336,188 for Method of and System for Detecting Object Weighing Interferences, Filed Jul. 21, 2014 (Amundsen et al.); 34 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/462,801 for Mobile Computing Device With Data Cognition Software, filed on Aug. 19, 2014 (Todeschini et al.); 38 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/277,337 for Multipurpose Optical Reader, filed May 14, 2014 (Jovanovski et al.); 59 pages.
U.S. Appl. No. 14/300,276 for Method and System for Considering Information About an Expected Response When Performing Speech Recognition, filed Jun. 10, 2014 (Braho et al.); 31 pages.
U.S. Appl. No. 14/460,829 for Encoded Information Reading Terminal With Wireless Path Selecton Capability, filed Aug. 15, 2014 (Wang et al.); 40 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.

U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
U.S. Appl. No. 14/460,387 for Apparatus for Displaying Bar Codes From Light Emitting Display Surfaces filed Aug. 15, 2014 (Van Horn et al.); 40 pages.
U.S. Appl. No. 14/310,226 for Autofocusing Optical Imaging Device filed Jun. 20, 2014 (Koziol et al.); 28 pages.
U.S. Appl. No. 14/305,153 for Indicia Reading System Employing Digital Gain Control filed Jun. 16, 2014 (Xian et al.); 53 pages.
U.S. Appl. No. 14/327,722 for Customer Facing Imaging Systems and Methods for Obtaining Images filed Jul. 10, 2014 (Oberpriller et al,); 39 pages.
U.S. Appl. No. 14/329,303 for Cell Phone Reading Mode Using Image Timer filed Jul. 11, 2014 (Coyle); 22 pages.
U.S. Appl. No. 14/370,237 for Web-Based Scan-Task Enabled System and Method of and Apparatus for Developing and Deploying the Same on a Client-Server Network filed Jul. 2, 2014 (Chen et al.); 65 pages.
U.S. Appl. No. 14/333,588 for Symbol Reading System With Integrated Scale Base filed Jul. 17, 2014 (Barten); 59 pages.
U.S. Appl. No. 14/446,387 for Indicia Reading Terminal Processing Plurality of Frames of Image Data Responsively to Trigger Signal Activation filed Jul. 30, 2014 (Wang et al.); 76 pages.
U.S. Appl. No. 14/446,391 for Multifunction Point of Sale Apparatus With Optical Signature Capture filed Jul. 30, 2014 (Good et al.); 37 pages.
U.S. Appl. No. 14/274,858 for Mobile Printer With Optional Battery Accessory, filed May 12, 2014, (Marty et al.); 26 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader, filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 29/492,903 for an Indicia Scanner, filed Jun. 4, 2014 (Zhou et al.); 23 pages.
U.S. Appl. No. 29/494,725 for an In-Counter Barcode Scanner, filed Jun. 24, 2014 (Oberpriller et al.); 23 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 14/339,708 for Laser Scanning Code Symbol Reading System, filed Jul. 24, 2014 (Xian et al.); 39 pages.
U.S. Appl. No. 14/379,057 for Method of Using Camera Sensor Interface to Transfer Multiple Channels of Scan Data Using an Image Format filed Aug. 15, 2014 (Wang et al.); 28 pages.
U.S. Appl. No. 14/283,282 for Terminal Having Illumination and Focus Control filed May 21, 2014 (Liu et al.); 31 pages.

(56) References Cited

OTHER PUBLICATIONS

Search Report and Written Opinion for EP Application No. 14190966; dated Apr. 23, 2015; 7 pages.

* cited by examiner

INDICIA-READING SYSTEM

CROSS-REFERENCE TO RELATED APPLICATION

The present application claims the benefit of U.S. Patent Application No. 61/908,204 for an Indicia-Reading System filed Nov. 25, 2013. The foregoing patent application is hereby incorporated by reference in its entirety.

FIELD OF THE INVENTION

The present invention relates to the field of indicia-reading systems and, more specifically, to indicia-reading systems having an indicia-reading apparatus with wireless charging capability.

BACKGROUND

Time spent waiting in checkout lines is a leading cause of customer dissatisfaction in retail shopping. Accordingly, retailers are continually seeking to improve the customer checkout experience.

A large percentage of retailers, notably grocery stores and general consumer merchandisers, rely on barcode technology to improve the efficiency and reliability of the checkout process. When entering pricing information at the point-of-sale, a product barcode is scanned by a barcode scanner and the product price is entered into the point-of-sale system.

Generally, a cashier scans items selected for purchase using an in-counter scanner (e.g., a bi-optic scanner). During the checkout process, an auxiliary hand-held indicia-reading apparatus may also be used by the cashier to provide additional flexibility (e.g., for coupon checking, loyalty card scanning, or shopping cart scanning). For instance, when a customer selects a large item for purchase that is impractical to lift and scan using an in-counter scanner, the cashier may use the auxiliary hand-held indicia-reading apparatus to provide convenient service.

Traditionally, the auxiliary hand-held indicia-reading apparatus was wired to the in-counter scanner using cords for power and communication. For maximum ease of use, however, wireless hand-held indicia readers having a rechargeable battery and a recharging base were developed. Wireless communication could be used between the portable hand-held unit and the in-counter unit in order to exchange information.

Although wireless communication may be used to exchange information between the portable hand-held indicia reader and the in-counter unit or register, a charging base is still needed in order to charge the portable unit. The charging base may be in a location that is not easy for the cashier to reach from the checkout station or it may occupy counter space on or around the in-counter unit. In any event, the requirement of a charging base is a tradeoff between efficiency and convenience.

Therefore, a need exists for improved indicia-reading systems having a hand-held reading apparatus with wireless charging capability.

SUMMARY

Accordingly, in one aspect, the present invention embraces an exemplary indicia-reading system. The indicia-reading system may include: (i) an indicia-capturing subsystem for acquiring information about indicia within the indicia-capturing subsystem's field of view, (ii) an indicia-decoding subsystem configured for decoding indicia information acquired by the indicia-capturing subsystem, (iii) a receiving inductor for wirelessly receiving energy, and (iv) a hand-supportable housing physically integrating the indicia-capturing subsystem, the indicia-decoding subsystem, and the receiving inductor. The system may further include an emitting inductor for wirelessly emitting energy to the hand-held indicia reader's receiving inductor.

In an exemplary embodiment, the system's emitting inductor and the hand-held indicia reader's receiving inductor may be tuned to resonant frequency.

In another exemplary embodiment, the hand-held indicia reader includes a battery physically integrated within the hand-supportable housing and the receiving inductor may be configured to charge the battery In yet another exemplary embodiment, the hand-held indicia reader includes a rectifier physically integrated within the hand-supportable housing and electrically integrated between the receiving inductor and the battery. The rectifier may be configured to convert RF-energy to DC energy.

In yet another exemplary embodiment, the hand-held indicia reader includes a super capacitor physically integrated within the hand-supportable housing. The receiving inductor may be configured to charge the super capacitor.

In yet another exemplary embodiment, the hand-held indicia reader includes a rectifier physically integrated within the hand-supportable housing and electrically integrated between the receiving inductor and the super capacitor. The rectifier may be configured to convert RF-energy to DC energy.

In yet another exemplary embodiment, the system may include an amplifier configured to drive the emitting inductor at resonance.

In yet another exemplary embodiment, the emitting inductor includes an emitting coil and a resonating coil.

In yet another exemplary embodiment, the receiving inductor includes a receiving coil and a resonating coil.

In yet another exemplary embodiment, the hand-held indicia reader includes a wireless communication module at least partially integrated within the hand-supportable housing.

In another aspect, the present invention embraces an exemplary indicia-reading system. The system may include a hand-held indicia reader having: (i) an auxiliary indicia-capturing subsystem for acquiring information about indicia within the auxiliary indicia-capturing subsystem's field of view, (ii) an auxiliary indicia-decoding subsystem configured for decoding indicia information acquired by the auxiliary indicia-capturing subsystem, (iii) a receiving inductor for wirelessly receiving energy, and (iv) a hand-supportable housing physically integrating the auxiliary indicia-capturing subsystem, the auxiliary indicia-decoding module, and the receiving inductor. The system may also include a point-of-sale indicia-reader having: (i) a point-of-sale indicia-capturing subsystem for acquiring information about indicia within the point-of-sale indicia-capturing subsystem's field of view, (ii) a point-of-sale indicia-decoding subsystem configured for decoding indicia information acquired by the point-of-sale indicia-capturing subsystem, and (iii) an emitting inductor for wirelessly emitting energy to the hand-held indicia reader's receiving inductor.

In an exemplary embodiment, the emitting inductor and the hand-held indicia reader's receiving inductor are tuned to the resonant frequency.

In another exemplary embodiment, the hand-held indicia reader includes a battery physically integrated within the hand-supportable housing, the receiving inductor being configured to charge the battery.

In yet another exemplary embodiment, the hand-held indicia reader includes a rectifier physically integrated within the hand-supportable housing and electrically integrated between the receiving inductor and the battery, the rectifier being configured to convert RF-energy to DC energy.

In yet another exemplary embodiment, the system may include an amplifier configured to drive the emitting inductor at resonance.

In yet another exemplary embodiment, the hand-held indicia reader includes a wireless communication module.

In yet another exemplary embodiment, the point-of-sale indicia-reader includes a wireless communication base.

In yet another exemplary embodiment, the hand-held indicia reader and the point-of-sale indicia-reader are in wireless communication.

In another aspect, the present invention embraces a method for wirelessly charging a hand-held indicia reader. The method may include providing a hand-held indicia reader comprising a receiving inductor for wirelessly receiving energy and a battery, the receiving inductor being configured to charge the battery; providing a charging station comprising an emitting inductor for wirelessly emitting energy to the hand-held indicia reader's receiving inductor; and charging the hand-held indicia reader using the charging station.

In an exemplary embodiment, the method may further include reading indicia using the charged hand-held indicia reader.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces indicia-reading systems and, more specifically, indicia-reading systems including wireless indicia readers. The term indicia as used herein is intended to refer broadly to various types of machine-readable indicia, including barcodes, QR codes, matrix codes, 1D codes, 2D codes, RFID tags, characters, etc. The indicia are typically graphical representations of information (e.g., data) such as product numbers, package tracking numbers, or personnel identification numbers. The use of indicia readers to input data into a system, rather than manual data entry, results in generally faster and more reliable data entry.

The indicia-reading systems of the present invention may embrace various kinds of devices used to read indicia, such as hand-held barcode scanners, fixed-position omni-directional barcode scanners, pen-type readers, laser scanners, CCD readers, imaging scanners, and mobile devices like smartphones that are equipped to read indicia, and similar devices.

The present indicia-reading systems improve the customer checkout process and the retail shopping experience. In particular, the systems permit a user (i.e., a checkout operator, cashier, etc.) to perform checkout or other related tasks that may be performed using a hand-held indicia-reading apparatus (e.g., coupon checking, loyalty card scanning, and check scanning) without the burden of a wire or a charging base.

An exemplary indicia-reading system, equipped with appropriate hardware and software, incorporates magnetic resonance based wireless charging. Base-free charging can save space at the point-of-sale and add convenience for the operator.

Figure 1:
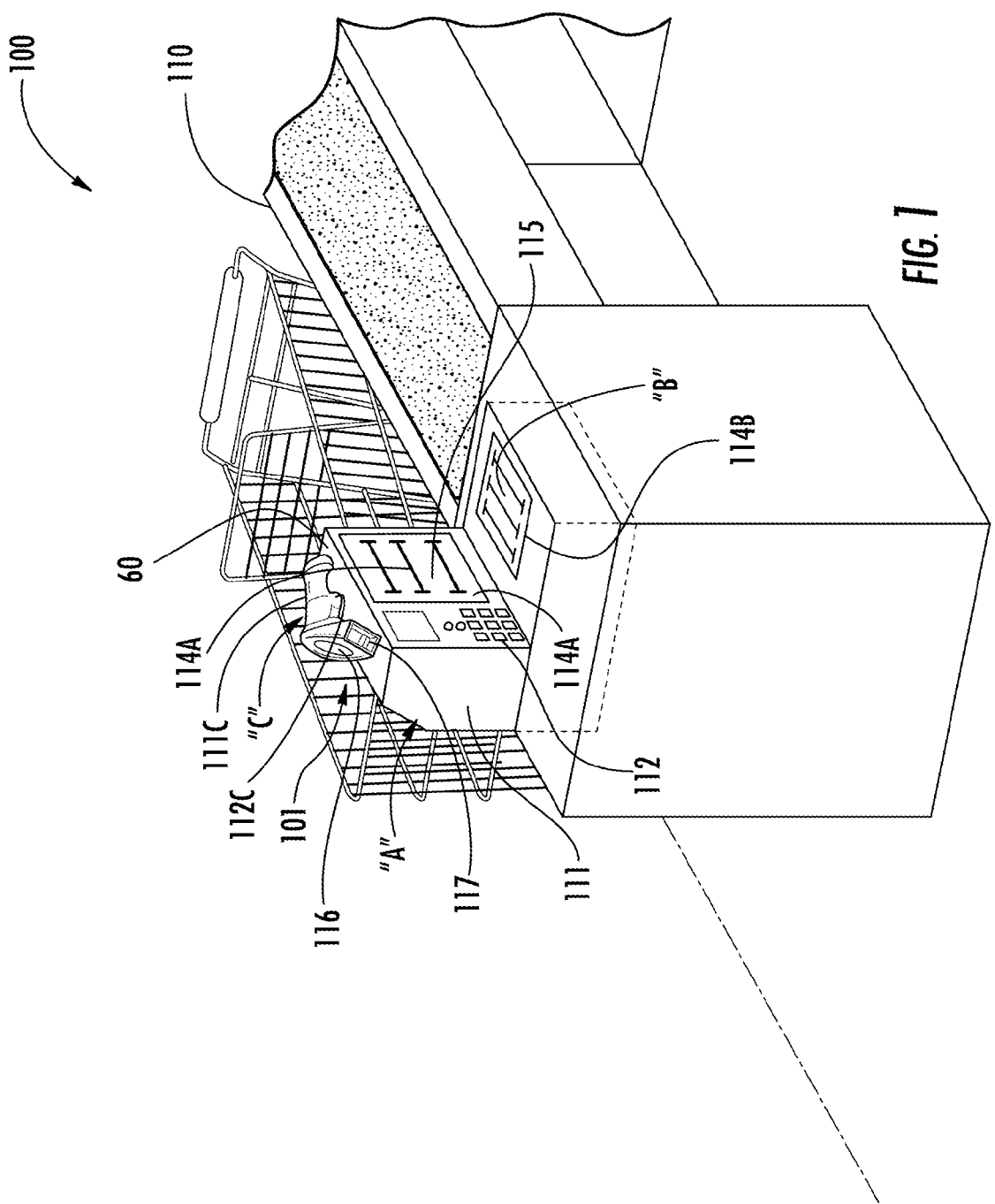
FIG. 1 is an exemplary indicia-reading system according to the present invention.

FIG. 1 illustrates an exemplary indicia-reading system 100 according to the present invention. As shown, the system 100 is implemented at a point-of-sale location.

The exemplary system 100 includes a bi-optic indicia reader 101 incorporated into a checkout counter 110 (i.e., a point-of-sale terminal) with indicia-reading paths at locations "A" and "B." The system 100 also includes an auxiliary hand-held indicia reader 101C shown at location "C." Although a trigger-type hand-held indicia reader 101C is shown, various kinds of devices that read indicia may be used (e.g., hand-held indicia readers such as pen-type readers and mobile devices like smartphones).

In some instances, the indicia-reading system 100 may include laser scanning subsystems that sweep light beams (e.g., a laser beam) across a scan path (i.e., a field of view), and then receive the optical signals that reflect or scatter off the indicium. Typically, the optical signal is received using a photoreceptor (e.g., photodiode) and is converted into an electrical signal. The electrical signal is an electronic representation of the indicia information (e.g., the data represented by the indicia). When in the form of an electrical signal, this information can be processed (e.g., decoded) by an indicia-decoding subsystem.

In other instances, the indicia-capturing subsystem may include an imaging subsystem or some combination of an imaging subsystem and a laser scanning subsystem. The imaging subsystem captures digital images of objects within the subsystem's field of view. When the indicia information takes the form of a digital image, the indicia information is typically processed by an indicia-decoding subsystem through the use of image-processing software (e.g., optical character recognition (OCR) technology), which can both identify the presence of indicia in the digital image and decode the indicia.

With reference to FIG. 1, exemplary indicia reader 101 includes a housing 111 and a keypad 112. Indicia reader 101 may also include a front-wall 115. As shown, front wall 115 extends upwardly in a generally vertical direction. Scan window 114A is disposed within front wall 115. Similarly, scan window 114B is disposed in housing 111 on a horizontal plane.

At location "C," hand-supportable housing 111C of hand-held indicia reader 101C is shown having a trigger style form factor. The exemplary hand-held indicia reader's housing 111C has a head portion 116 that is provided with a light transmission window 117. The light transmission window 117 may include a laser (e.g., infrared) and/or an image reading sensor that is utilized for reading symbols, images, and the like. Manually actuated trigger switch 112C may be depressed to activate the indicia-reading module and corresponding indicia-decoding subsystem. Trigger 112C of hand-held indicia reader 101C and keypad 112 of indicia reader 101 can be regarded as a user interface of indicia-reading system 100.

Figure 2:
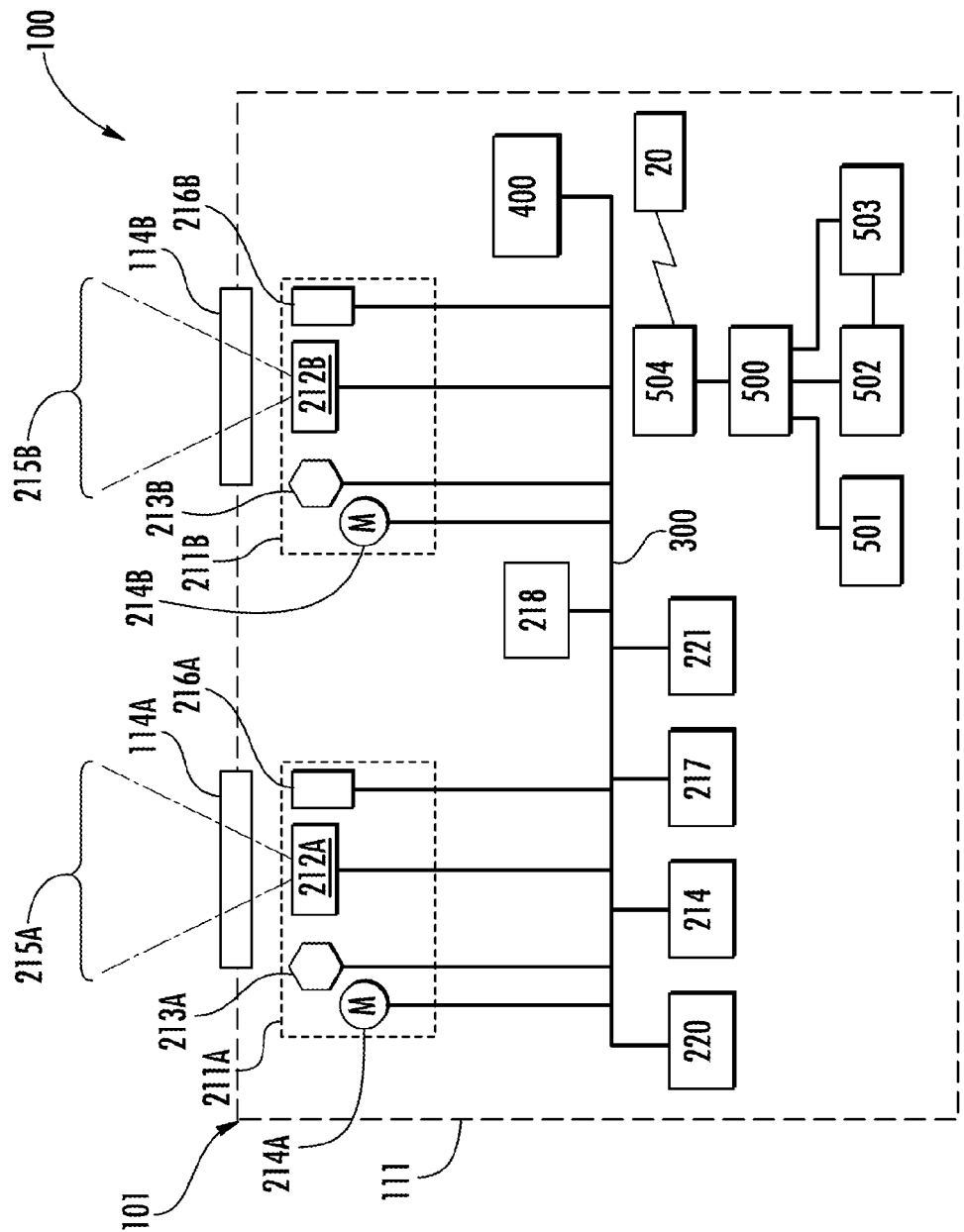
FIG. 2 is a block diagram illustrating certain components of an exemplary indicia-reading system according to the present invention

Referring now to FIG. 2, certain components of exemplary indicia-reader 101 are shown in block diagram format. Indicia reader 101 may include one or more light sensing assemblies (i.e., indicia-capturing subsystems). In the particular embodiment of FIG. 2, indicia-reader 101 includes first laser based light sensing assembly 211A and second laser based light sensing assembly 211B. Indicia-reading apparatus 101 can have fewer (e.g., one or more) or more (e.g., 5 or more) light sensing assemblies with any combination of technology (e.g., laser-based or image-sensor-based indicia-capturing subsystems, including necessary hardware and software).

Referring to the indicia-reader as shown at FIG. 2, laser based light sensing assembly 211A can include a laser assembly 212A, a rotating reflector 213A, and a photo detector assembly 216A. Rotating reflector 213A can be rotated by the use of motor 214A. Laser assembly 212A can include a laser light source in combination with laser light shaping optics. Light emitting from laser assembly 212A, which propagates along a scan path 215A, can be reflected from rotating reflector 213A and directed to detector assembly 216A. For generation of one or more scan paths, the rotating reflector 213A can be replaced by an alternative structure (e.g. a pivoting reflector).

Photodetector assembly 216A can receive light reflected from objects intersecting the scan paths and can generate data representing the reflected light. Photodetector assembly 216A can include, in one embodiment, an integrated amplifier, and an analog to digital converter.

Light sensing assembly 211A can output a signal. A photodetector of photodetector assembly 216A may output a signal in the form of an analog signal, an amplifier of assembly 216A may output a signal in the form of an amplified analog signal, and an analog to digital converter within photo detector assembly 216A may output a signal in the form of a digital signal, which can be routed to memory 217 for processing by CPU 218 (e.g., for attempting to decode decodable indicia). Emitted and received laser light can be directed through scan window 114A.

Laser light can reflect off an object positioned in front of scan window 114A and can travel along an axis in a receiving direction back to detector assembly 216A. When the object includes a barcode, the light can strike areas of dark and white bands and can be reflected.

Detector assembly 216A includes a detector. An amplifier and analog to digital converter can receive the reflected beam of variable intensity, generate an analog signal corresponding to the reflected beam, and convert it to a digital signal for storage into memory 217 where it can be processed by a CPU 218 in accordance with a program stored in non-volatile memory.

While light sensing assembly 211A is depicted as including a certain number of elements, the assembly can be provisioned with fewer than or greater than the depicted number of elements.

Referring to laser scanning based light sensing assembly 211B, the laser based light sensing assembly can have elements 212B, 213B, 214B, 215B, and 216B, which operate in the manner of corresponding elements 212A, 213A, 214A, 215A, and 216A of laser based light sensing assembly 211A. Regarding scan windows 114A and 114B, the scan windows may include light transmissive glass or polycarbonate.

Referring to further aspects of the exemplary indicia-reading system 100, indicia reader 101 can include central processing unit (CPU) 218 for processing digital signals output by one or more light sensing assemblies (i.e., an indicia-decoding subsystem). The indicia reader 101 may also include random access memory (RAM) 217, a read only memory 219, and a storage memory 220 (e.g., flash memory, a hard drive, etc.). Indicia reader 101 can further include a direct memory access controller DMA 221 which can operate to efficiently route a digital signal output by one or more light sensing assemblies of indicia reader 101 to memory 217.

For attempting to decode a bar code symbol (e.g., a one dimensional bar code symbol), CPU 218 can process digital signal image data. The data corresponds to a line of pixel positions (e.g., a row, a column, or a diagonal set of pixel positions) in the case of an image-sensor-array-based light sensing assembly, or otherwise a digital signal representing an indicia corresponding to a scan path 215A, 215B in the case of a laser-scanning-based light sensing assembly 211A, 211B to determine a spatial pattern of dark and light cells. The CPU 218 can convert each light and dark cell pattern determined into a character or character string via table lookup.

Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Regarding CPU 218, CPU 218 may run an operating system (OS) and a plurality of applicable device drivers via a communication interface 400. CPU 218 is coupled to system bus 300.

Indicia reader 101 can include a power supply 500 that supplies power to a power grid 504 to which electrical components (e.g., integrated circuits), including wireless charging system 20, can be connected. Power supply 500 can be coupled to various power sources (e.g., a battery 501), a serial interface 502 (e.g., USB RS232), and/or an AC/DC transformer 503. With reference to FIG. 2, a dashed border illustrates housing 111 with components depicted within the dashed border being components disposed within housing 111.

Figure 3:
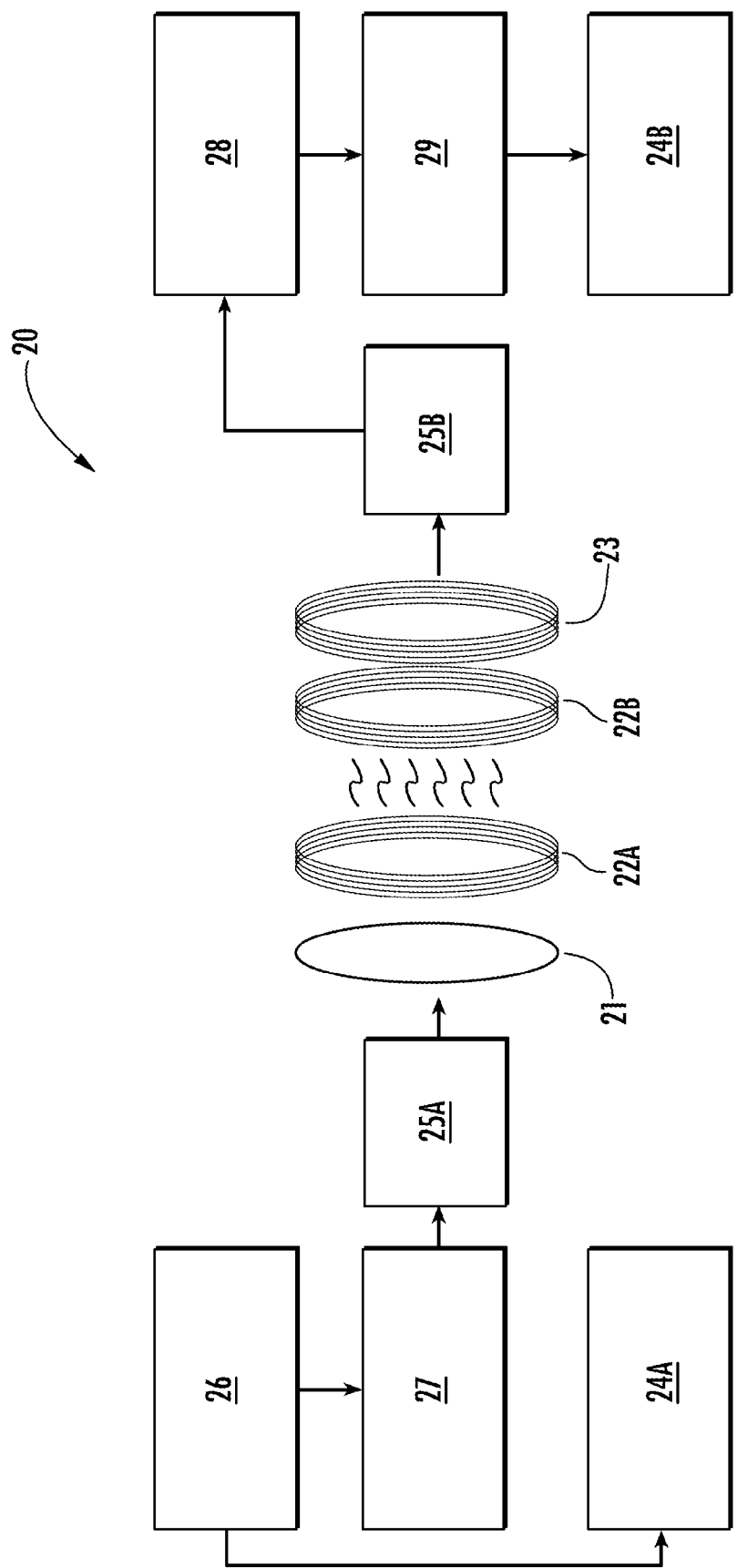
FIG. 3 is a block diagram illustrating certain components of an exemplary wireless charging system according to the present invention.

Referring now to FIG. 3, certain components of an exemplary magnetic resonance based wireless charging system 20 are set forth in block diagram format. Unlike existing inductive chargers based on tightly coupled magnetic induction, magnetic resonance charging alleviates the need for tight coupling, which in turn provides benefits for the indicia-reading systems of the present invention. Thus, although other charging systems could be used with the exemplary indicia-reading system 100 (e.g., magnetic induction), magnetic resonance charging can provide benefits.

One benefit is flexibility in the relative orientations between the charging station and the hand-held unit during operation. Additionally, a single source can be used to transfer energy to more than one device, even when the devices have different power requirements. Further, given the ability to operate at lower magnetic coupling values, the respective sizes of the source and device resonators are not constrained, and the distances between source and device may be larger. In one instance, for example, the transmission coil can be embedded under the countertop scanner's housing, the charging coil has a higher tolerance for misalignment, the transfer distance between the auxiliary unit and charging coil can be longer, and multiple portable indicia-reading devices may be charged through the same charging fixture.

Wireless charging system 20 includes an AC/DC adapter 26 to convert AC power (e.g., AC main power) into a DC voltage and a DC/RF amplifier 27 to convert the DC voltage into an amplified RF frequency. This frequency is tuned to the resonating coils' 22A, 22B resonant frequency. The RF signal from the amplifier 27 is coupled to the emitting coil 21 via an impedance matching network 25A to ensure good power transfer at the resonant frequency and to minimize reverse reflection that could damage the RF amplifier 27. The emitting coil is inductively coupled to the first resonating coil 22A. This coil is, in turn, coupled to the second resonating coil 22B through some physical separation. The receiving coil couples the received energy from the second resonating coil 22B into a RF/DC rectifier 28 via an impedance matching network 25B. The DC power is then fed to the indicia reader load 29 (e.g., an energy storage device).

A wireless communication module pair 24A, 24B is included in the respective transmission and receiving sides of the system 20 for data communication. The wireless communication may include, but is not limited to, ZigBee® and Bluetooth® protocols.

Figure 4:
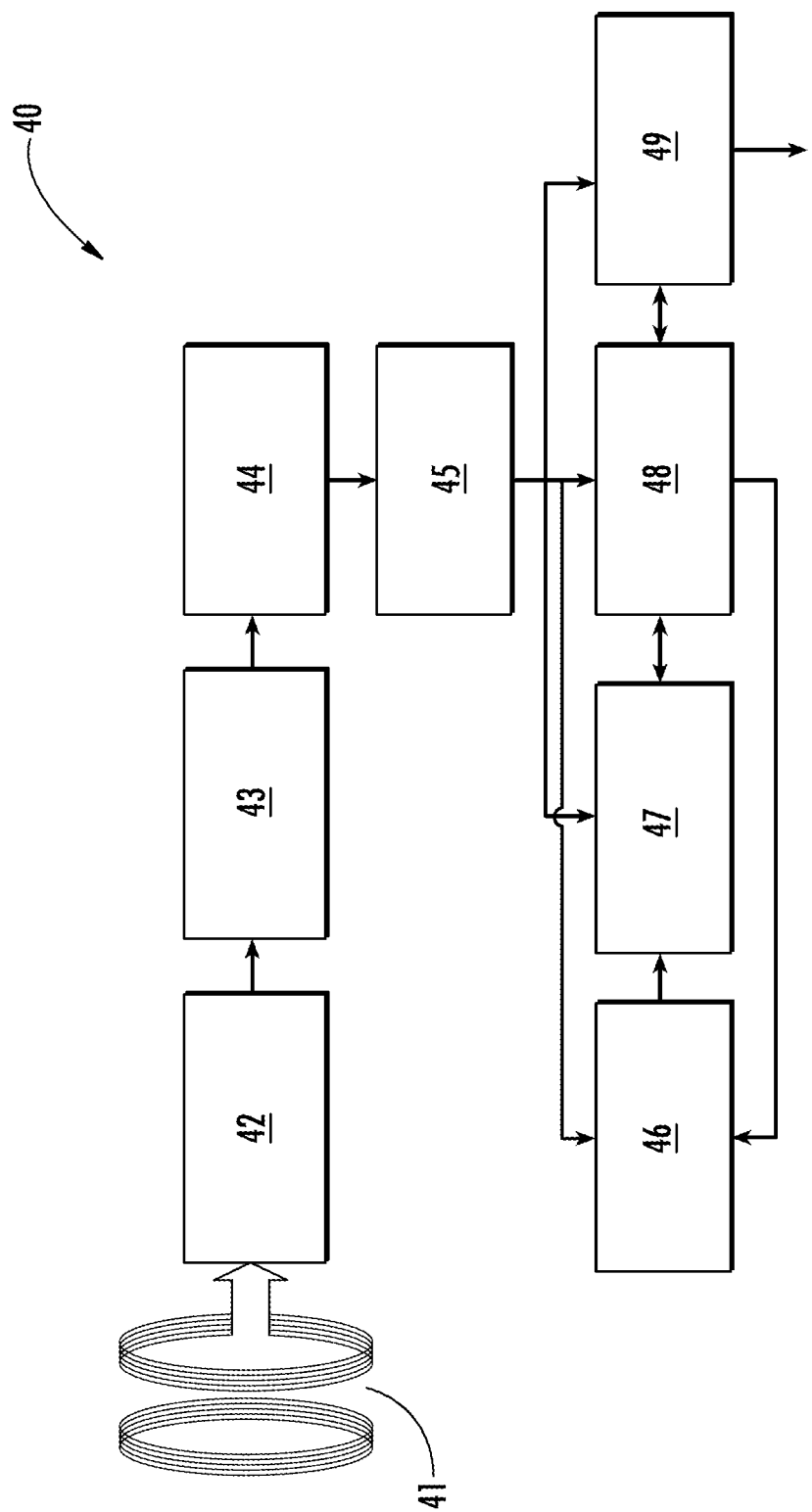
FIG. 4 is a block diagram illustrating certain components of an exemplary wireless indicia reader according to the present invention.

FIG. 4 is a block diagram illustrating hardware components of an embodiment of a wireless charging portable indicia reader 40 using a super capacitor (i.e., an ultracapacitor or electric double-layer capacitor) as a storage device rather than a traditional rechargeable battery. The super capacitor has advantages for portable indicia-reading application given its lower cost, fast and efficient charge/discharge due to small internal resistance (typical 98%-99% efficiency), long cycle life due to no reversible chemical interaction, and wide operating temperature range of around −40 to +70 degrees.

Wireless power is coupled between resonating coils (not shown in FIG. 4) and picked up by a receiving coil 41. The receiving coil's impedance is matched to the RF/DC rectifier using an impedance matching network 42. The super capacitor 44 is charged through RF/DC rectifier 43. Power management module 45 manages the voltage for indicia-reading modules such as optical source 46, signal condition circuitry 47, and processor 48. A wireless communication module 49 is used to communicate with a base (not shown in FIG. 4), such as indicia reader 101.

FIG. 1 is an embodiment of an exemplary indicia-reading system 100 of the present invention including a hand-held wireless charging indicia reader 101C. A wireless charging station 60 includes a magnetic resonance module and wireless communication module as depicted at FIGS. 3-4. As shown, the charging station 60 is mounted on the top tower (i.e., the hood) of the indicia reader housing 111, but the station 60 could be mounted on the side of the tower or at some other location. The station 60 could also be mounted under the checkout countertop 110.

As implemented in FIG. 1, the whole top tower or hood of the indicia reader housing 111 can become a charging surface (i.e., a charging zone). Multiple hand-held wireless charging indicia readers (not shown) of various types and configurations could charge and communicate through the same charging station 60. In this way, a traditional charging base is eliminated, space at the point-of-sale is maximized, and the system is more convenient for the operator To supplement the present disclosure, this application incorporates entirely by reference the following commonly assigned patents, patent application publications, and patent applications: U.S. Pat. No. 6,832,725; U.S. Pat. No. 7,128,266; U.S. Pat. No. 7,159,783; U.S. Pat. No. 7,413,127; U.S. Pat. No. 7,726,575; U.S. Pat. No. 8,294,969; U.S. Pat. No. 8,317,105; U.S. Pat. No. 8,322,622; U.S. Pat. No. 8,366,005; U.S. Pat. No. 8,371,507; U.S. Pat. No. 8,376,233; U.S. Pat. No. 8,381,979; U.S. Pat. No. 8,390,909; U.S. Pat. No. 8,408,464; U.S. Pat. No. 8,408,468; U.S. Pat. No. 8,408,469; U.S. Pat. No. 8,424,768; U.S. Pat. No. 8,448,863; U.S. Pat. No. 8,457,013; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,523,076; U.S. Pat. No. 8,528,819; U.S. Pat. No. 8,544,737; U.S. Pat. No. 8,548,242; U.S. Pat. No. 8,548,420; U.S. Pat. No. 8,550,335; U.S. Pat. No. 8,550,354; U.S. Pat. No. 8,550,357; U.S. Pat. No. 8,556,174; U.S. Pat. No. 8,556,176; U.S. Pat. No. 8,556,177; U.S. Pat. No. 8,559,767; U.S. Pat. No. 8,559,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584,945; U.S. Pat. No. 8,587,595; U.S. Pat. No. 8,587,697; U.S. Pat. No. 8,588,869; U.S. Pat. No. 8,590,789; U.S. Pat. No. 8,593,539; U.S. Pat. No. 8,596,542; U.S. Pat. No. 8,596,543; U.S. Pat. No. 8,599,271; U.S. Pat. No. 8,600,158; U.S. Pat. No. 8,600,167; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0225757; U.S. Patent Application Publication No. 2011/0169999; U.S. Patent Application Publication No. 2012/0111946; U.S. Patent Application Publication No. 2012/0168511; U.S. Patent Application Publication No. 2012/0168512; U.S. Patent Application Publication No. 2012/0193407; U.S. Patent Application Publication No. 2012/0193423; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0056285; U.S. Patent Application Publication No. 2013/0068840; U.S. Patent Application Publication No. 2013/0070322; U.S. Patent Application Publication No. 2013/0075168; U.S. Patent Application Publication No. 2013/0082104; U.S. Patent Application Publication No. 2013/0175343; U.S. Patent Application Publication No. 2013/0256418; U.S. Patent Application Publication No. 2013/0270346; U.S. Patent Application Publication No. 2013/0278425; U.S. Patent Application Publication No. 2013/0284801; U.S. Patent Application Publication No. 2013/0287258; U.S. Patent Application Publication No. 2013/0292474; U.S. Patent Application Publication No. 2013/0292475; U.S. patent application Ser. No. 13/347,193 for a Hybrid-Type Bioptical Laser Scanning And Digital Imaging System Employing Digital Imager With Field Of View Overlapping Field Of Field Of Laser Scanning Subsystem, filed Jan. 10, 2012 (Kearney et al.); U.S. patent application Ser. No. 13/367,047 for Laser Scanning Modules Embodying Silicone Scan Element With Torsional Hinges, filed Feb. 6, 2012 (Feng et al.); U.S. patent application Ser. No. 13/367,978 for a Laser Scanning Module Employing An Elastomeric U-Hinge Based Laser Scanning Assembly, filed Feb. 7, 2012 (Feng et al.); U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz); U.S. patent application Ser. No. 13/471,973 for Terminals and Methods for Dimensioning Objects, filed May 15, 2012; U.S. patent application Ser. No. 13/492,883 for a Laser Scanning Module With Rotatably Adjustable Laser Scanning Assembly, filed Jun. 10, 2012 (Hennick et al.); U.S. patent application Ser. No. 13/736,139 for an Electronic Device Enclosure, filed Jan. 8, 2013 (Chaney); U.S. patent application Ser. No. 13/750,304 for Measuring Object Dimensions Using Mobile Computer, filed Jan. 25, 2013; U.S. patent application Ser. No. 13/771, 508 for an Optical Redirection Adapter, filed Feb. 20, 2013 (Anderson); U.S. patent application Ser. No. 13/780,158 for a Distraction Avoidance System, filed Feb. 28, 2013 (Sauerwein); U.S. patent application Ser. No. 13/780,196 for Android Bound Service Camera Initialization, filed Feb. 28, 2013 (Todeschini et al.); U.S. patent application Ser. No. 13/780,271 for a Vehicle Computer System with Transparent Display, filed Feb. 28, 2013 (Fitch et al.); U.S. patent application Ser. No. 13/780,356 for a Mobile Device Having Object-Identification Interface, filed Feb. 28, 2013 (Samek et al.); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/792, 322 for a Replaceable Connector, filed Mar. 11, 2013 (Skvoretz); U.S. patent application Ser. No. 13/852,097 for a System and Method for Capturing and Preserving Vehicle Event Data, filed Mar. 28, 2013 (Barker et al.); U.S. patent application Ser. No. 13/885,218 for a Indicia Encoding System with Integrated Purchase and Payment Information, filed Oct. 6, 2013 (Liu et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/895,846 for a Method of Programming a Symbol Reading System, filed Apr. 10, 2013 (Corcoran); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,110 for a System and Method for Display of Information Using a Vehicle-Mount Computer, filed May 24, 2013 (Hollifield); U.S. patent application Ser. No. 13/902, 144, for a System and Method for Display of Information Using a Vehicle-Mount Computer, filed May 24, 2013 (Chamberlin); U.S. patent application Ser. No. 13/902,242 for a System For Providing A Continuous Communication Link With A Symbol Reading Device, filed May 24, 2013 (Smith et al.); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930,913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); U.S. patent application Ser. No. 13/947,296 for a System and Method for Selectively Reading Code Symbols, filed Jul. 22, 2013 (Rueblinger et al.); U.S. patent application Ser. No. 13/950,544 for a Code Symbol Reading System Having Adjustable Object Detection, filed Jul. 25, 2013 (Jiang); U.S. patent application Ser. No. 13/961,408 for a Method for Manufacturing Laser Scanners, filed Aug. 7, 2013 (Saber et al.); U.S. patent application Ser. No. 13/973,315 for a Symbol Reading System Having Predictive Diagnostics, filed Aug. 22, 2013 (Nahill et al.); U.S. patent application Ser. No. 13/973,354 for a Pairing Method for Wireless Scanner via RFID, filed Aug. 22, 2013 (Wu et al.); U.S. patent application Ser. No. 13/974,374 for Authenticating Parcel Consignees with Indicia Decoding Devices, filed Aug. 23, 2013 (Ye et al.); U.S. patent application Ser. No. 14/018,729 for a Method for Operating a Laser Scanner, filed Sep. 5, 2013 (Feng et al.); U.S. patent application Ser. No. 14/019,616 for a Device Having Light Source to Reduce Surface Pathogens, filed Sep. 6, 2013 (Todeschini); U.S. patent application Ser. No. 14/023,762 for a Handheld Indicia Reader Having Locking Endcap, filed Sep. 11, 2013 (Gannon); and U.S. patent application Ser. No. 14/035,474 for Augmented-Reality Signature Capture, filed Sep. 24, 2013 (Todeschini); U.S. patent application Ser. No. 14/058, 721 for a Terminal Configurable for Use Within an Unknown Regulatory Domain, filed Oct. 21, 2013 (Pease et al.); U.S. patent application Ser. No. 14/035,474 for Augmented-Reality Signature Capture, filed Sep. 24, 2013 (Todeschini); U.S. patent application Ser. No. 14/050,515 for Hybrid-Type Bioptical, filed Oct. 10, 2013 (Edmonds et al.); U.S. patent application Ser. No. 14/055,234 for Dimensioning System, filed Oct. 16, 2013 (Fletcher); U.S. patent application Ser. No. 14/055,353 for Dimensioning System, filed Oct. 16, 2013 (Giordano et al.); U.S. patent application Ser. No. 14/050,675 for Apparatus for Displaying Bar Codes from Light Emitting Display Surfaces, filed Oct. 10, 2013 (Horn et al.); U.S. patent application Ser. No. 14/053,314 for Indicia Reader, filed Oct. 14, 2013 (Huck); U.S. patent application Ser. No. 14/058,762 for Terminal Including Imaging Assembly, filed Oct. 21, 2013 (Gomez et al.); U.S. patent application Ser. No. 14/058,831 for System Operative to Adaptively Select an Image Sensor for Decodable Indicia Reading, filed Oct. 21, 2013 (Sauerwein); U.S. patent application Ser. No. 14/062,239 for Chip on Board Based Highly Integrated Imager, filed Oct. 24, 2013 (Toa et al.); U.S. patent application Ser. No. 14/065,768 for Hybrid System and Method for Reading Indicia, filed Oct. 29, 2013 (Meier et al.); U.S. patent application Ser. No. 14/074,746 for Self-Checkout Shopping System, filed Nov. 8, 2013 (Hejl et al.) U.S. patent application Ser. No. 14/074,787 for Method and System for Configuring Mobile Devices via NFC Technology, filed Nov. 8, 2013 (Smith et al.); U.S. Patent Application No. 61/632,425 for Laser Scanning Code Symbol Reading System Employing Multi-Channel Scan Data Signal Processing With Synchronized Digital Gain Control (Tao et al.) For Full Range Scanning filed May 18, 2012 (Xian et al.); U.S. Patent Application No. 61/632,426 for a Laser Scanning Code Symbol Reading System Providing Improved Control Over The Length And Intensity Characteristics Of A Laser Scan Line Projected Therefrom Using Laser Source Blanking Control filed May 21, 2012 (Brady et al.); U.S. Patent Application No. 61/714,394 for an Integrated Dimensioning and Weighing System filed Oct. 16, 2012 (McCloskey et al.); U.S. Patent Application No. 61/714,415 for a Replaceable Connector filed Oct. 16, 2012 (Skvoretz); U.S. Patent Application No. 61/715,990 for a Vehicle Computer System with Transparent Display filed Oct. 19, 2012 (Fitch et al.); U.S. Patent Application No. 61/733,007 for a Mobile Device Having Object-Identification Interface filed Dec. 4, 2012 (Samek et al.); U.S. Patent Application No. 61/740,964 for a Barcode Scanner with Integrated Surface Authentication filed Dec. 21, 2012 (Havens et al.); U.S. Patent Application No. 61/741,780 for a Laser Scanning Code Symbol Reading System Employing Programmable Decode Time-Window Filtering filed May 25, 2012 (Wilz et al.); U.S. Patent Application No. 61/751,411 for a System for Managing Scanner Devices filed Jan. 11, 2013 (Crimm et al.); U.S. Patent Application No. 61/752,088 for a Laser Scanning Module Employing a Laser Scanning Assembly Having Elastomeric Wheel Hinges filed Jan. 14, 2013 (Havens et al); U.S. Patent Application No. 61/787,414 for an Integrated Dimensioning and Weighing System filed Mar. 15, 2013 (McCloskey et al.); U.S. Patent Application No. 61/807,825 for a Wearable Barcode Scanner filed Apr. 3, 2013 (Wang); U.S. Patent Application No. 61/833,517 for an Integrated Dimensioning and Weighing System filed Jun. 11, 2013 (McCloskey et al.); U.S. Patent Application No. 61/841,717 for a Dimensioning System filed Jul. 1, 2013 (Fletcher); and U.S. Patent Application No. 61/872,299 for a System and Method for Package Dimensioning, filed Aug. 30, 2013 (Lloyd et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for wirelessly charging an auxiliary hand-held indicia reader, comprising:
   providing an auxiliary hand-held indicia reader comprising a housing, a receiving inductor for wirelessly receiving energy and an energy storage device, the receiving inductor being configured to charge the energy storage device;
   providing a charging zone proximate to an emitting inductor, the emitting inductor incorporated into a top tower of a bi-optic point-of-sale terminal for wirelessly emitting energy to the auxiliary hand-held indicia reader's receiving inductor when the auxiliary hand-held indicia reader is placed in the charging zone;
   placing the auxiliary hand-held indicia reader in the charging zone in any relative orientation to the emitting inductor; and
   charging the energy storage device through magnetic resonance coupling of the receiving inductor and the emitting inductor while the auxiliary hand-held indicia reader rests on the point-of-sale terminal or is in non-contact proximity to the charging zone.

2. The method of claim 1, wherein the auxiliary hand-held indicia reader has a trigger style form factor.

3. The method of claim 1, wherein the energy storage device comprises a battery physically integrated within the housing, the receiving inductor being configured to charge the battery.

4. The method of claim 3, wherein the hand-held indicia reader comprises a rectifier physically integrated within the hand-supportable housing and electrically integrated between the receiving inductor and the battery, the rectifier being configured to convert RF-energy to DC energy.

5. The method of claim 1, wherein the energy storage device comprises a super capacitor physically integrated within the hand-supportable housing, the receiving inductor being configured to charge the super capacitor.

6. The method of claim 5, wherein the hand-held indicia reader comprises a rectifier physically integrated within the hand-supportable housing and electrically integrated between the receiving inductor and the super capacitor, the rectifier being configured to convert RF-energy to DC energy.

7. The method of claim 1, wherein the emitting inductor and the receiving inductor are tuned to a resonant frequency.

8. The method of claim 1, comprising an amplifier configured to drive the emitting inductor at resonance.

9. The method of claim 1, wherein the emitting inductor comprises an emitting coil and a resonating coil.

10. The method of claim 1, wherein the receiving inductor comprises a receiving coil and a resonating coil.

11. The method of claim 1, wherein the hand-held indicia reader comprises a wireless communication module at least partially integrated within the housing.

12. The method of claim 11, wherein the hand-held indicia reader and the in-counter indicia-reader are in wireless communication.

13. The method of claim 1, wherein the charging zone is a cradleless charging zone.

* * * * *